US008520601B2

(12) United States Patent
Ko et al.

(10) Patent No.: US 8,520,601 B2
(45) Date of Patent: Aug. 27, 2013

(54) METHOD AND APPARATUS FOR ACQUIRING ANTENNA INFORMATION IN A WIRELESS COMMUNICATION SYSTEM

(75) Inventors: Hyun Soo Ko, Anyang-si (KR); Moon Il Lee, Anyang-si (KR); Bin Chul Ihm, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 13/322,134

(22) PCT Filed: May 26, 2010

(86) PCT No.: PCT/KR2010/003323
§ 371 (c)(1),
(2), (4) Date: Nov. 22, 2011

(87) PCT Pub. No.: WO2010/137866
PCT Pub. Date: Dec. 2, 2010

(65) Prior Publication Data
US 2012/0076102 A1    Mar. 29, 2012

Related U.S. Application Data

(60) Provisional application No. 61/181,014, filed on May 26, 2009.

(30) Foreign Application Priority Data

May 26, 2010    (KR) .......................... 10-2010-0049002

(51) Int. Cl.
*H04B 7/02* (2006.01)
*H04W 4/00* (2009.01)

(52) U.S. Cl.
USPC ............................................. 370/328; 375/267

(58) Field of Classification Search
None
See application file for complete search history.

(56) References Cited

U.S. PATENT DOCUMENTS

| | | | | |
|---|---|---|---|---|
| 8,315,324 B2 * | 11/2012 | Lee et al. | ...................... | 375/267 |
| 8,331,476 B2 * | 12/2012 | Jongren | ...................... | 375/267 |
| 8,400,939 B2 * | 3/2013 | Kim et al. | ...................... | 370/252 |
| 8,428,018 B2 * | 4/2013 | Noh et al. | ...................... | 370/329 |
| 8,442,151 B2 * | 5/2013 | Lee et al. | ...................... | 375/299 |
| 2004/0192242 A1 | 9/2004 | Dinur et al. | | |
| 2007/0135161 A1 | 6/2007 | Molnar et al. | | |
| 2009/0060088 A1 | 3/2009 | Callard et al. | | |
| 2011/0116428 A1 * | 5/2011 | Seong et al. | .................. | 370/311 |

* cited by examiner

*Primary Examiner* — Min Jung
(74) *Attorney, Agent, or Firm* — Lee, Hong, Degerman, Kang & Waimey

(57) ABSTRACT

The present invention relates to a wireless communication system, and discloses a method and apparatus for acquiring antenna information. According to the present invention, a method in which user equipment acquires information of a transmission antenna of an eNB comprises the steps of: receiving a physical broadcast channel (PBCH) including information which indicates whether or not the eNB supports an extended transmission antenna configuration; decoding the received physical broadcast channel, and checking the transmission modes of the physical broadcast channel; and acquiring information of the transmission antenna of the eNB from one or more of the transmission modes checked in the previous step and information which indicates whether or not the eNB supports an extended transmission antenna configuration.

12 Claims, 5 Drawing Sheets

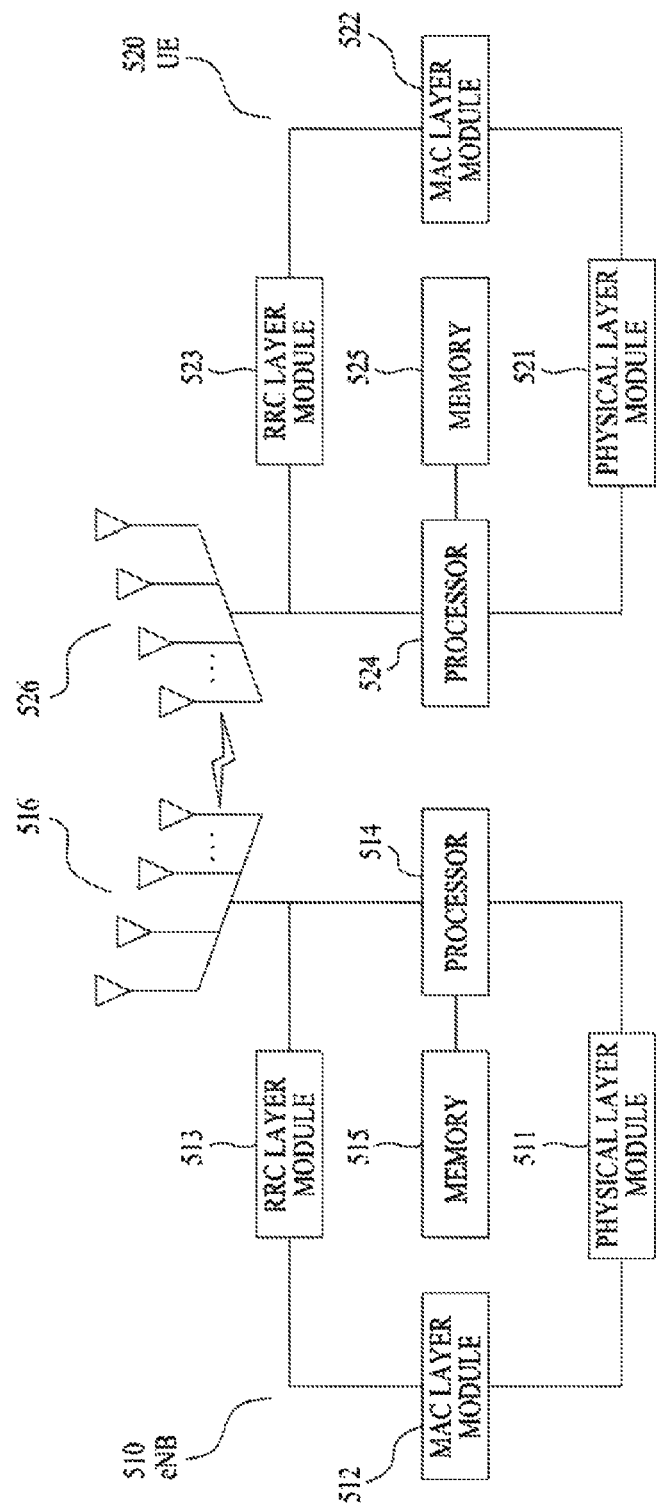

METHOD AND APPARATUS FOR ACQUIRING ANTENNA INFORMATION IN A WIRELESS COMMUNICATION SYSTEM

CROSS-REFERENCE TO RELATED APPLICATIONS

This application is a 371 U.S. national stage application of International Application No. PCT/KR2010/003323, filed on May 26, 2010, which claims priority to Korean Application Serial No. 10-2010-0049002, filed on May 26, 2010, and U.S. Provisional Application Ser. No. 61/181,014, filed on May 26, 2009, the contents of which are incorporated by reference herein in their entirety.

TECHNICAL FIELD

The present invention relates to a wireless communication system, and more particularly, to a method and apparatus for acquiring antenna information.

BACKGROUND ART

In a $3^{rd}$ Generation Partnership Project (3GPP) Long Term Evolution (LTE) system, a user equipment (UE) which receives data over a physical downlink shared channel (PDSCH) operates according to one of several transmission modes. The transmission mode defines rules for transmitting data between a base station (eNB) and a UE. In the existing 3GPP LTE standard, seven transmission modes of (1) port 0 single-antenna port transmission, (2) transmit diversity, (3) open-loop spatial multiplexing, (4) closed-loop spatial multiplexing, (5) multi-user multiple input multiple output (MU-MIMO), (6) closed-loop rank 1 precoding and (7) port 5 single-antenna port transmission are defined. The transmission modes are UE-specifically or semi-statistically set.

In association with the transmission mode, an antenna configuration of an eNB (or a cell) is defined. The antenna configuration may be, for example, information about the number of antenna ports. The antenna configuration may be cell-specifically set. A UE may determine an antenna configuration of an eNB by reception of a physical broadcast channel (PBCH) from the eNB.

The PBCH is a control channel for transmitting system information such as a downlink system bandwidth and a system frame number (SFN). However, an antenna configuration is not explicitly included in a message transmitted on the PBCH. Accordingly, a UE should blind detect the antenna configuration of an eNB using the PBCH. More specifically, the UE may perform blind detection by decoding the message on the PBCH according to different MIMO transmission schemes (single antenna, space frequency block coding (SFBC) and SFBC-frequency switched transmit diversity (FSTD)) corresponding to various numbers of transmission antennas (for example, 1, 2, or 4 transmission antennas) of the eNB.

A cyclic redundancy check (CRC) bit of the message on the PBCH is masked with a bit stream indicating the number of transmission antennas. Accordingly, the UE may reliably detect the number of transmission antennas of the eNB by checking the CRC of the message transmitted on the PBCH in addition to the above-described blind detection.

According to the method of blind detecting the number of transmission antennas of the eNB, since a decoding process needs to be performed at least three times according to three antenna configurations and the PBCH is repeatedly transmitted four times in a time domain, the UE must perform blind decoding a maximum of 12 times in order to acquire the antenna configuration of the eNB.

In addition, in the existing 3GPP LTE system (including Release 8 and 9), 1-, 2- or 4-Tx antenna configuration is defined in downlink transmission. However, in the 3GPP LTE-A (Advanced) system, an eNB may support a maximum of eight transmission antennas in downlink transmission. In the 3GPP LTE-A system, a UE based on the existing 3GPP LTE standard and a UE based on the 3GPP LTE-A standard need to accurately acquire information about a transmission antenna configuration of an eNB. The UE based on the existing 3GPP LTE standard may recognize eight transmission antennas of the eNB as four transmission antennas using an antenna virtualization scheme for grouping the eight transmission antennas two antennas by two antennas. Meanwhile, the UE based on the 3GPP LTE-A standard also operates to acquire transmission antenna configuration information of the eNB through the same blind detection as the existing 3GPP LTE standard and CRC. However, currently, in the 3GPP LTE standard, since a method of accurately informing a UE that the number of transmission antennas of the eNB is eight is not defined, even when the eNB has eight transmission antennas, the UE misrecognizes that the number of transmission antennas of the eNB is less than 8.

DISCLOSURE

Technical Problem

As the number of transmission antennas supported by an eNB is increased, there is a need for a new method of enabling a user equipment (UE) to efficiently and accurately acquire transmission antenna configuration information of the eNB.

Technical Solution

The object of the present invention can be achieved by providing a method for acquiring information about transmission antennas of a base station at a user equipment, including receiving a physical broadcast channel (PBCH) including information indicating whether the base station supports an extended transmission antenna configuration, decoding the received PBCH and checking a transmission mode of the PBCH, and acquiring the information about the transmission antennas of the base station from at least one of the checked transmission mode or the information indicating whether the base station supports the extended transmission antenna configuration.

The method may further include checking a cyclic redundancy check (CRC) bit of the decoded PBCH, and acquiring information about the number of transmission antennas of the base station from the CRC bit. The CRC bit may be masked with a specific bit stream corresponding to the number of transmission antennas of the base station.

The specific bit stream for masking the CRC bit may be determined according to Table 1:

TABLE 1

| Number of transmission antennas of eNB | PBCH CRC mask |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |
| 8 | <1, 0, 1, 0, 1, 0, 1, 0, 1, 0, 1, 0, 1, 0, 1, 0> |

The information indicating whether the base station supports the extended transmission antenna configuration may be composed of one bit. If the information indicating whether the base station supports the extended transmission antenna configuration has a value of 1, the user equipment may determine that the number of transmission antennas of the base station is 8, and, if the information indicating whether the base station supports the extended transmission antenna configuration has a value of 0, the user equipment determines that the number of transmission antennas of the base station may be less than 8.

In another aspect of the present invention, there is provided a method for acquiring information about transmission antennas of a base station at a user equipment, including receiving a radio resource control (RRC) signal including information about the number of transmission antenna ports of the base station and a transmission mode and a physical broadcast channel (PBCH), decoding the received PBCH and checking the transmission mode of the PBCH, and acquiring the information about the transmission antennas of the base station using at least one of the checked transmission mode and the RRC signal, wherein the RRC signal includes information indicating a maximum of eight transmission antennas as the number of transmission antennas and one or more transmission modes using the maximum of eight transmission antennas.

The one or more transmission modes using the maximum of eight transmission antennas may include a closed-loop spatial multiplexing with a dedicated reference signal.

In another aspect of the present invention, there is provided a method for providing information about transmission antennas from a base station to a user equipment, including generating a physical broadcast channel (PBCH) including information indicating whether the base station supports an extended transmission antenna configuration, and adding a cyclic redundancy check (CRC) bit to the generated PBCH and transmitting the PBCH to the user equipment, wherein the CRC bit is masked with a specific bit stream corresponding to the number of transmission antennas of the base station.

In another aspect of the present invention, there is provided a method for providing information about transmission antennas from a base station to a user equipment, including transmitting a radio resource control (RRC) signal including the number of transmission antenna ports of the base station and a transmission mode to the user equipment, and transmitting a physical broadcast channel (PBCH) to the user equipment, wherein the RRC signal includes information indicating a maximum of eight transmission numbers as the number of transmission antennas and one or more transmission modes using the maximum of eight transmission modes.

In another aspect of the present invention, there is provided a user equipment for acquiring information about transmission antennas of a base station, including a physical layer module configured to receive and decode a physical channel from the base station, and a processor configured to control the user equipment including the physical layer module, wherein the physical layer module receives a physical broadcast channel (PBCH) including information indicating whether the base station supports an extended transmission antenna configuration and decodes the received PBCH, and wherein the processor checks a transmission mode of the PBCH depending on whether the PBCH is successfully decoded by the physical layer module and acquires the information about the transmission antennas of the base station from at least one of the checked transmission or the information indicating whether the base station supports the extended antenna configuration.

In another aspect of the present invention, there is provided a user equipment for acquiring information about transmission antennas of a base station, including a physical layer module configured to receive and decode a physical broadcast channel (PBCH) from the base station, a radio resource control (RRC) layer module configured to receive and process an RRC signal from the base station, and a processor configured to control the user equipment including the physical layer module and the RRC layer module, wherein the RRC layer module acquires information about the number of transmission antenna ports and a transmission mode included in the RRC signal, the RRC signal including information indicating a maximum of eight transmission antennas as the number of transmission antennas and information indicating one or more transmission modes using the maximum of eight transmission antennas, and wherein the processor checks a transmission mode of the PBCH depending on whether the PBCH is successfully decoded by the physical layer module and acquires the information about the transmission antennas of the base station from at least one of the checked transmission or the RRC signal.

In another aspect of the present invention, there is provided a base station for providing information about transmission antennas to a user equipment, including a physical layer module configured to encode a physical channel, map the physical channel to downlink radio resources, and transmit the physical channel to the user equipment, wherein the physical layer module generates a physical broadcast channel (PBCH) including information indicating whether the base station supports an extended transmission antenna configuration, adds a cyclic redundancy check (CRC) bit masked with a specific bit stream corresponding to the number of transmission antennas of the base station to the generated PBCH, and transmits the PBCH to the user equipment.

In another aspect of the present invention, there is provided a base station for providing information about transmission antennas to a user equipment, including a radio resource control (RRC) layer module configured to transmit an RRC signal to the user equipment, and a physical layer module configured to encode a physical broadcast channel (PBCH), map the PBCH to downlink radio resources, and transmit the PBCH to the user equipment, wherein the RRC layer module generates and transmits the RRC signal including the number of transmission antenna ports of the base station and a transmission mode to the user equipment, and wherein the RRC signal includes information about a maximum of eight transmission antennas as the number of transmission antennas and one or more transmission modes using the maximum of eight transmission antennas.

Advantageous Effects

According to the present invention, it is possible for a user equipment to efficiently and accurately acquire information regarding a transmission antenna configuration of a base station supporting a maximum of eight transmission antennas.

The effects of the present invention are not limited to the above-described effects and other effects which are not described herein will become apparent to those skilled in the art from the following description.

DESCRIPTION OF DRAWINGS

FIG. 5 is a diagram showing the configuration of an eNB and a user equipment according to an embodiment of the present invention.

BEST MODE

Figure 1:
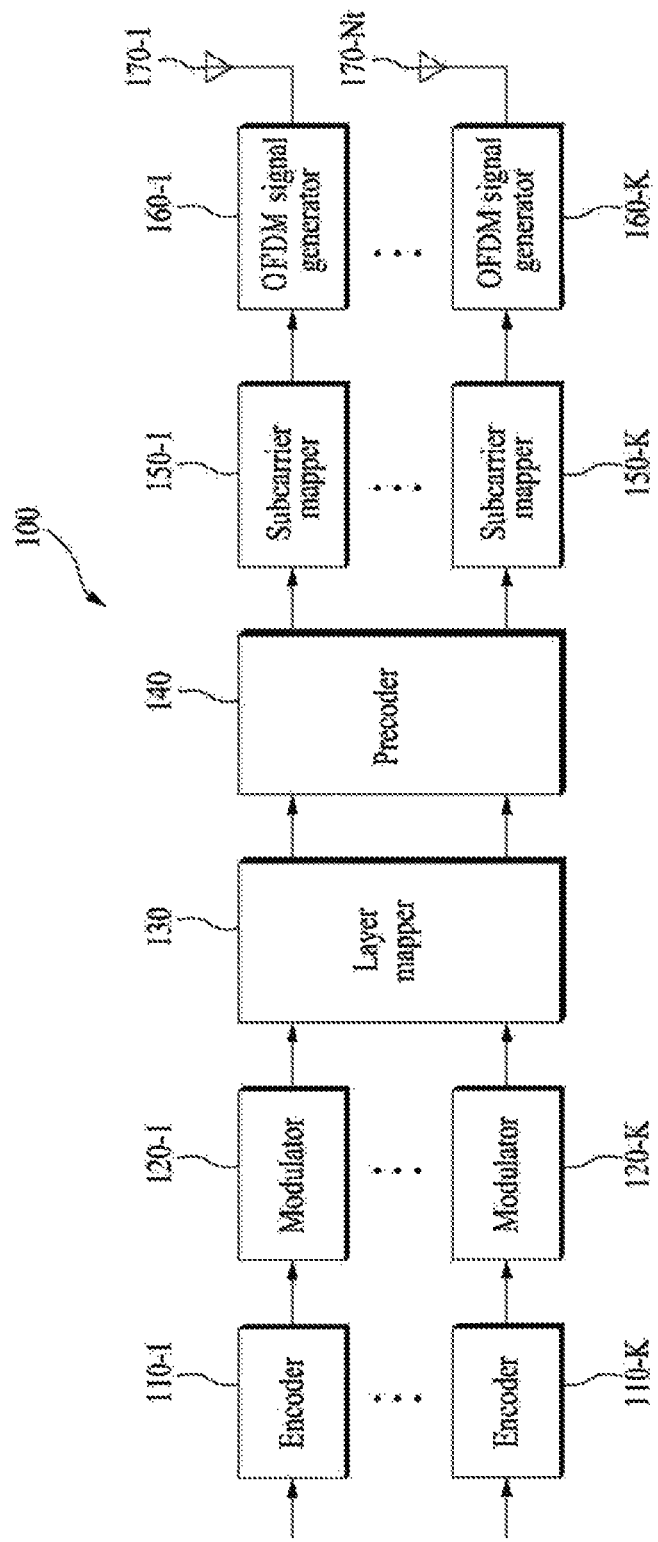
FIG. 1 is a block diagram showing the configuration of a transmitter including multiple antennas.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a user equipment (UE). In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (VM-Fi), IEEE 802.16 (VViMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A system. However, the technical spirit of the present invention is not limited thereto.

FIG. 1 is a block diagram showing the configuration of a transmitter including multiple antennas.

Referring to FIG. 1, a transmitter 100 includes encoders 110-1, . . . , and 110-K, modulators 120-1, . . . , and 120-K (or modulation mappers), a layer mapper 130, a predecoder 140, subcarrier mappers 150-1, . . . , and 150-K (or resource element mappers) and OFDM signal generators 160-1, . . . , and 160-K. The transmitter 100 includes Nt transmission antennas 170-1, . . . , and 170-Nt.

The encoders 110-1, . . . , and 110-K encode input data according to a predetermined coding method and generate coded data. The modulation mappers 120-1, . . . , and 120-K map the coded data to modulation symbols representing locations on a signal constellation. A modulation scheme is not limited and may be m-phase shift keying (PSK) or m-quadrature amplitude modulation (QAM). For example, the m-PSK may be BPSK, QPSK or 8-PSK. The m-QAM may be 16-QAM, 64-QAM or 256-QAM.

The layer mapper 130 defines layers of the modulation symbols so as to distribute antenna-specific symbols into antenna paths. The layer is defined as an information path input to the precoder 140. The previous information path of the precoder 140 may be referred to as a virtual antenna or layer.

The precoder 140 processes the modulation symbols using a MIMO scheme according to the multiple transmission antennas 170-1, . . . , and 170-Nt and outputs antenna-specific symbols. The precoder 140 distributes the antenna-specific symbols to the resource element mappers 150-1, . . . , and 150-K of the antenna paths. Each information path transmitted to one antenna by the precoder is referred to as a stream, or may be referred to as a physical antenna.

The resource element mappers 150-1, . . . , and 150-K allocate the antenna-specific symbols to appropriate resource elements and multiplex the antenna-specific symbols on a per-user basis. The OFDM signal generators 160-1, . . . , and 160-K modulate the antenna-specific symbols using an OFDM scheme and output OFDM symbols. The OFDM signal generators 160-1, ..., and 160-K may perform Inverse Fast Fourier Transform (IFFT) with respect to the antenna-specific symbols and insert a cyclic prefix (CP) into time-domain symbols subjected to IFFT. The CP is a signal inserted into a guard interval in order to eliminate inter-symbol interference due to multiple paths in an OFDM transmission scheme. The OFDM symbols are transmitted via the transmission antennas 170-1, ..., and 170-Nt.

Figure 2:
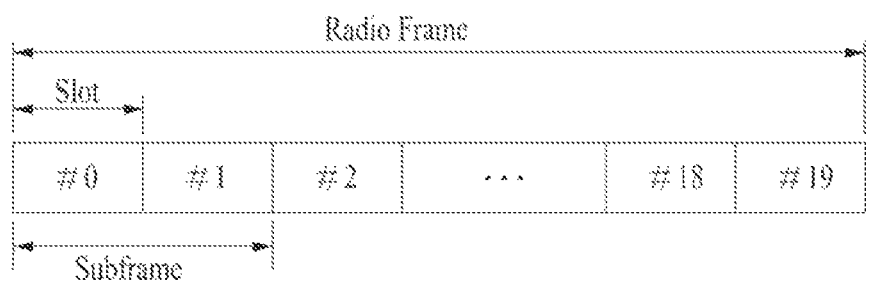
FIG. 2 is a diagram showing the structure of a downlink radio frame.

FIG. 2 is a diagram showing the structure of a downlink radio frame.

Referring to FIG. 2, a downlink radio frame includes 10 subframes, and one subframe includes two slots. The downlink radio frame may be configured by frequency division duplexing (FDD) or time division duplexing (TDD). A time required for transmitting one subframe is referred to as a Transmission Time Interval (TTI). For example, one subframe may have a length of 1 ms and one slot may have a length of 0.5 ms. One slot may include a plurality of OFDM symbols in a time region and include a plurality of Resource Blocks (RBs) in a frequency region.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a user equipment (UE) moves at a high speed, the extended CP may be used in order to further reduce inter-symbol interference.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in the radio frame, the number of slots included in the subframe or the number of symbols included in the slot may be changed in various manners.

Figure 3:
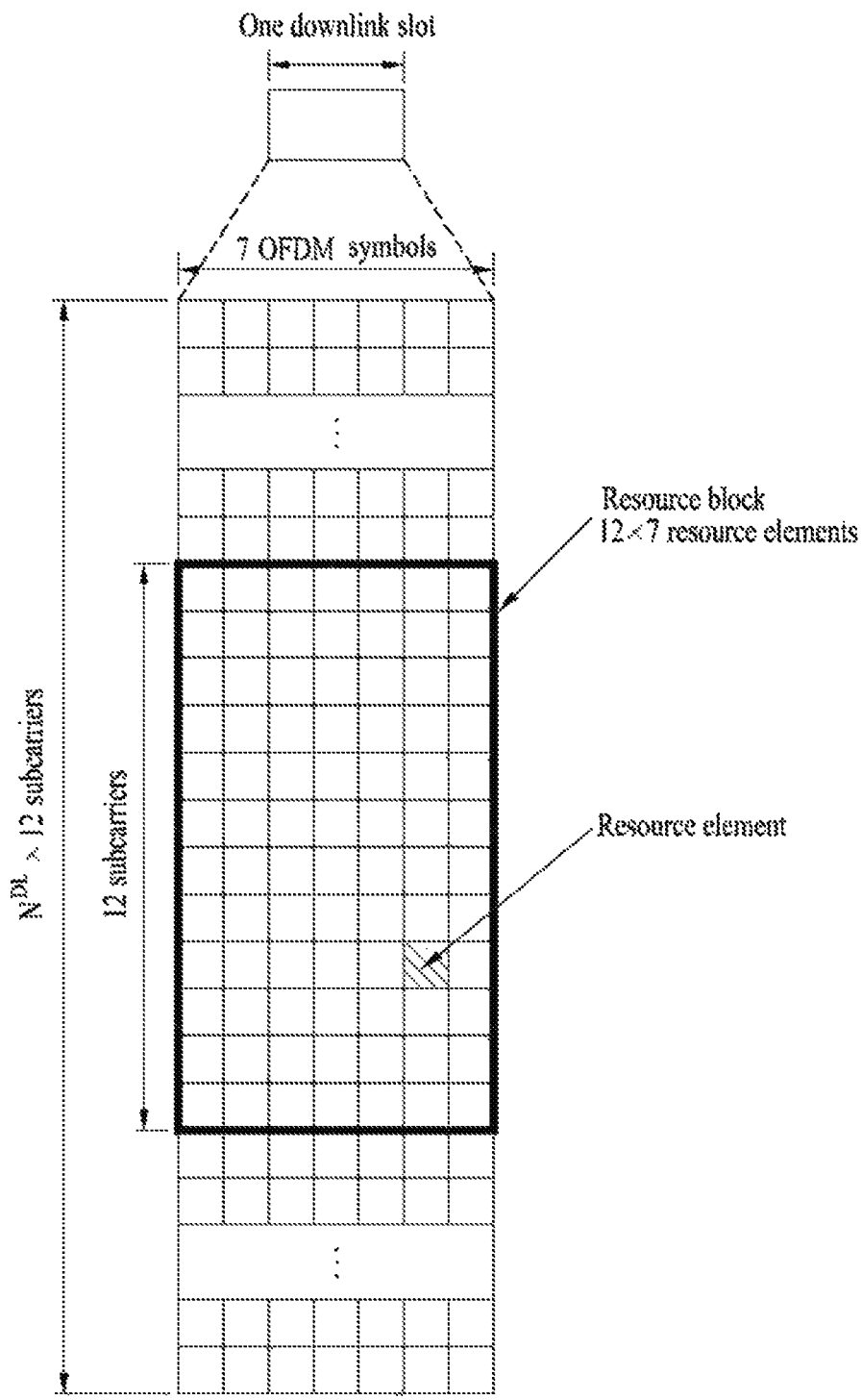
FIG. 3 is a diagram showing a resource grid of one downlink slot.

FIG. 3 is a diagram showing a resource grid of one downlink slot. OFDM symbols are configured by the normal CP. Referring to FIG. 3, the downlink slot includes a plurality of OFDM symbols in a time region and includes a plurality of RBs in a frequency region. Although one downlink slot includes seven OFDM symbols and one RB includes 12 subcarriers, the present invention is not limited thereto. Each element of the resource grid is referred to as a Resource Element (RE). For example, a RE a(k,l) is located at a k-th subcarrier and an I-th OFDM symbol. One RB includes 12×7 REs. Since an interval between subcarriers is 15 kHz, one RB includes about 180 kHz in the frequency region. $N^{DL}$ denotes the number of RBs included in the downlink slot. The value of $N^{DL}$ is determined based on downlink transmission bandwidth set by scheduling of an eNB.

Figure 4:
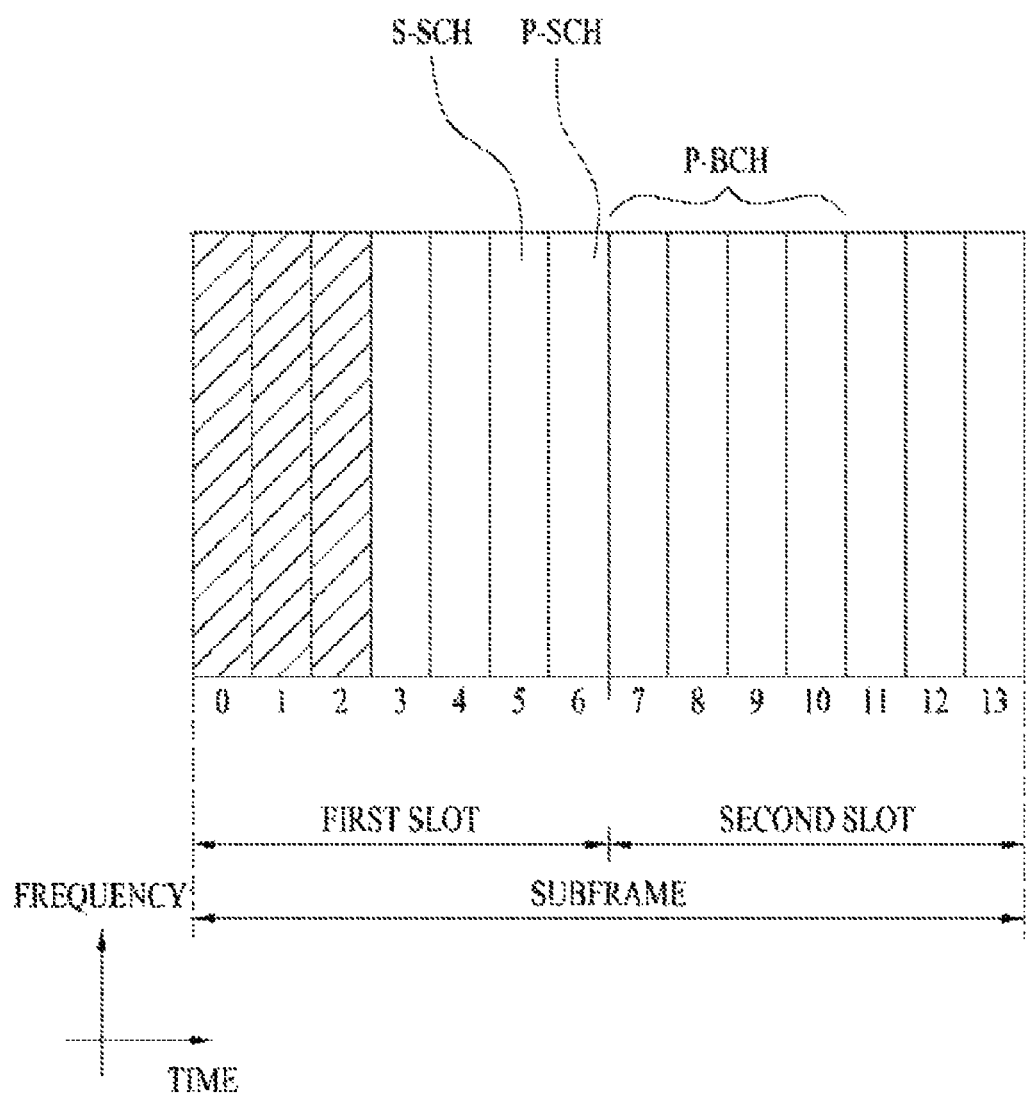
FIG. 4 is a diagram showing the structure of a downlink subframe.

FIG. 4 is a diagram showing the structure of a downlink subframe in case of using the normal CP. A subframe includes two slots in a time domain. A maximum of three OFDM symbols of a front portion of a first slot within one subframe corresponds to a control region to which control channels are allocated. The remaining OFDM symbols correspond to a data region to which Physical Downlink Shared Channels (PDSCHs) are allocated.

A primary synchronization channel (P-SCH), a secondary synchronization channel (S-SCH) and a physical broadcast channel (PBCH) shown in FIG. 4 are associated with an initial operation such as cell search of a UE and acquisition of broadcast information of an eNB. A UE performs an initial cell search operation such as synchronization with an eNB when power is turned on or the UE enters a new cell. For the initial cell search operation, the UE may receive the P-SCH from the eNB to perform slot synchronization with the eNB, and receive the S-SCH to perform frame synchronization with the eNB. If the downlink radio frame supports FDD, the P-SCH may be mapped to last OFDM symbols (that is, a sixth OFDM symbol of the subframe with periodicity of five subframes) of $0^{th}$ and $10^{th}$ slots (see FIG. 2) of the radio frame as shown in FIG. 4. If the downlink radio frame supports TDD, the P-SCH may be mapped to a third OFDM symbol of first and sixth subframes (not shown). The S-SCH may be mapped to a fifth OFDM symbol (that is, a fifth OFDM symbol of the subframe with periodicity of five subframes) of $0^{th}$ and $10^{th}$ slots (see FIG. 2) of the radio frame as shown in FIG. 4.

The PBCH is transmitted in a $0^{th}$ subframe of FIG. 2 (that is, is transmitted with periodicity of 10 frames) and is mapped to seventh to $10^{th}$ OFDM symbols in one subframe as shown in FIG. 4.

The PBCH is a channel via which a master information block (MIB) of system information is transmitted. The system information includes a first layer (L1) parameter such as downlink system bandwidth, a system frame number (SFN), a 1-bit duration of a physical HARQ indicator channel (PHICH), 2-bit PHICH resources, etc. The PBCH is modulated using a quadrature phase shift keying (QPSK) scheme and is cell-specifically scrambled before modulation. In addition, the PBCH may have a length of a maximum of 40 bits.

Resource elements used by the PBCH are configured independently of the number of transmission antenna ports used by the eNB and reference signals are mapped to the resource elements used to transmit the PBCH regardless of the actual number of transmission antenna ports used by the eNB.

The PBCH does not include explicit bits indicating the number of transmission antennas of the eNB. The eNB transmits a control channel and a data channel using a specific MIMO transmission mode according to a transmission antenna configuration. More specifically, a single antenna transmission mode is used if the number of transmission antennas of the eNB is 1, an SFBC transmission mode is used if the number of transmission antennas of the eNB is 2, and an SFBC-FSTD transmission mode is used if the number of transmission antennas of the eNB is 4.

The PBCH is also transmitted in a specific MIMO transmission mode according to the transmission antenna configuration of the eNB. The UE may blind detect the PBCH so as to detect the transmission antenna configuration of the eNB. That is, the UE attempts to hypothesize the MIMO transmission mode to decode the PBCH according to the hypothesis. If decoding fails, the PBCH may be decoded according to the hypothesis for another transmission mode and, if decoding is successful, it is determined that the hypothesis is correct. If the UE successfully decodes the PBCH, the number of transmission antennas of the eNB corresponding to the MIMO transmission mode may be checked. For example, the UE may attempt to decode the PBCH according to a hypothesis of the single antenna transmission mode and attempt to decode the PBCH according to another transmission mode if decoding fails. The UE attempts to decode the PBCH according to the SFBC transmission mode. If decoding is successful, it is determined that the number of transmission antennas of the eNB is 2.

In addition, a CRC bit added when encoding the PBCH is masked with a bit stream corresponding to the number of transmission antennas of the eNB. Accordingly, the UE may check the CRC bit of the decoded PBCH so as to reliably check the number of transmission antennas of the eNB. The PBCH CRC mask may be defined as shown in Table 1.

TABLE 1

| Number of transmission antennas of eNB | PBCH CRC mask |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

According to the method of acquiring the transmission antennas configuration of the eNB, since the case in which the number of transmission antennas of the eNB is 8 is not considered, the UE may not accurately acquire the antenna configuration information of the eNB. Therefore, there is a need for a method of accurately acquiring the antenna configuration information of the eNB by a UE supporting eight transmission antennas of the eNB (e.g., a UE based on the 3GPP LTE-A standard) without influencing the operation of a UE which does not support eight transmission antennas of the eNB (e.g., a UE based on the 3GPP LTE release 8 and 9 standards). The following various embodiments of the present invention relate to a method and apparatus for accurately and efficiently acquiring a transmission antenna configuration of an eNB by a UE supporting eight transmission antennas of the eNB while maintaining compatibility with the operation of the existing UE.

Embodiment 1

In Embodiment 1, whether an eNB supports an extended antenna configuration may be indicated using an unused bit field of the existing PBCH.

Even when the eNB supports the extended antenna configuration (e.g., eight transmission antennas), a UE (e.g., a 3GPP LTE-A UE) supporting the extended antenna configuration of the eNB and a UE (e.g., a 3GPP LTE UE) which does not support the extended antenna configuration of the eNB may coexist. The 3GPP LTE-A UE may receive and decode a control channel and data transmitted according to a transmission scheme corresponding to the extended antenna configuration from the eNB supporting the extended antenna configuration, but the 3GPP LTE UE may not perform such reception and decoding. However, the 3GPP LTE UE also needs to receive a service from the eNB supporting the extended antenna configuration. Accordingly, the eNB supporting the extended antenna configuration may transmit at least a control channel (a PBCH, a PDCCH, a PHICH, etc.) using a transmission mode for enabling the 3GPP LTE-A UE and the 3GPP LTE UE to perform decoding. That is, even the eNB supporting the extended antenna configuration may transmit the PBCH in a single antenna transmission mode, an SFBC transmission mode or an SFBC-FSTD transmission mode corresponding to the number of transmission antennas of 1, 2 or 4.

In consideration of such fact, information acquired by enabling both the 3GPP LTE UE and the 3GPP LTE-A UE to blind decode the PBCH is limited to the basic antenna configuration (that is, 1, 2 or 4 transmission antennas) of the eNB, and the extended antenna configuration of the eNB is not checked only by blind decoding of the PBCH.

Meanwhile, the PBCH includes a maximum of 40 bits, but a plurality of bits reserved as unused bits are present. In the PBCH according to the existing definition, bit fields indicating system information are analyzed by a UE and the remaining reserved bit fields are not analyzed by the UE. In Embodiment 1, using one bit of the reserved bit fields, whether the eNB supports the extended antenna configuration (e.g., 8-Tx antenna configuration) or the existing antenna configuration (e.g., 1-, 2- or 4-Tx antenna configuration) may be indicated.

The UE may acquire the basic antenna configuration of the eNB by blind decoding the PBCH and determine whether the eNB supports the extended antenna configuration by analyzing the bit field of the decoded PBCH. For example, if a 1-bit indicator of the antenna configuration of the eNB in the PBCH has a value of "0", it may be indicated that the antenna configuration acquired by blind decoding of the PBCH is used. Meanwhile, if a 1-bit indicator of the antenna configuration of the eNB in the PBCH has a value of "1", the UE determines that the eNB uses the extended antenna configuration (for example, eight transmission antennas).

The UE based on the 3GPP LTE standard and the UE based on the 3GPP-A standard may commonly blind decode the PBCH to acquire information about the basic antenna configuration of the eNB. The UE based on the 3GPP LTE-A standard may analyze the newly defined 1-bit indicator for the extended antenna configuration of the eNB so as to determine whether the eNB supports the extended antenna configuration. Meanwhile, the 3GPP LTE UE analyzes the bit field of the PBCH as defined in the LTE standard (e.g., 3GPP LTE release 8 or release 9) and does not analyze the 1-bit indicator for the transmission antenna configuration of the eNB newly defined in Embodiment 1. Since the 3GPP LTE UE supports a maximum of four transmission antennas of the eNB, the 3GPP LTE UE need not determine whether the eNB supports the extended antenna configuration and the newly defined 1-bit indicator does not influence operation of the existing UE. Substantially, the operation for acquiring the antenna configuration information of the eNB by the 3GPP LTE UE is irrelevant to the 1-bit indicator newly defined in Embodiment 1 and the UE performs the existing operation.

Newly defining the bit field of the PBCH enables the 3GPP LTE-A UE to acquire the extended antenna configuration information of the eNB without influencing the operation of the UE based on the 3GPP LTE standard. Accordingly, it is possible to provide backward compatibility. In addition, the UE may accurately acquire an antenna configuration of a neighbor cell through a PBCH of the neighbor cell of a cell which provides a service to the UE. By using the antenna configuration information of the neighbor cell, an operation such as inter-cell interference management or coordinated multi point (CoMP) defined in the 3GPP LTE-A may be efficiently performed.

Embodiment 2

In Embodiment 2, a new CRC mask of a PBCH may be used to more reliably inform a UE that an eNB supports an extended antenna configuration.

The CRC bit of the PBCH is masked using a bit stream corresponding to the number of transmission antennas of the eNB. In the operation of the UE which blind decodes the PBCH to check the antenna configuration supported by the eNB, the UE may secure reliability of the transmission antenna configuration information of the eNB through the bit stream masked to the CRC of the decoded PBCH.

The existing PBCH CRC mask defines only the bit streams corresponding to 1, 2 or 4 transmission antennas of the eNB. In Embodiment 2, as shown in Table 2, a bit stream <1, 0, 1, 0, 1, 0, 1, 0, 1, 0, 1, 0, 1, 0, 1, 0> corresponding to eight transmission antennas of the eNB is additionally defined. Therefore, the UE may additionally secure reliability of the transmission antenna configuration of the eNB supporting the extended antenna configuration through the CRC mask of the decoded PBCH.

TABLE 2

| Number of transmission antennas of eNB | PBCH CRC mask |
| --- | --- |
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |
| 8 | <1, 0, 1, 0, 1, 0, 1, 0, 1, 0, 1, 0, 1, 0, 1, 0> |

Embodiment 3

In Embodiment 3, the antenna configuration of the eNB and the transmission mode may be indicated to the UE using radio resource control (RRC) signaling.

RRC signaling is system information as a broadcast control channel (BCCH) and is sent to the UE as a cell-specific RRC parameter. The BCCH is a logical channel which is mapped to a broadcast channel (BCH) which is a transport channel for transmitting system information. The BCH which is the transport channel is mapped to a physical broadcast channel (PBCH) which is a physical channel.

The transmission scheme is closely associated with the antenna configuration. An "AntennaInfo" information element is defined in RRC information elements of the 3GPP LTE standard (release 8 or 9) (see Table 3). In the "AntennaInfo" information element, a transmission mode is defined along with antenna information. In the transmission mode defined according to the antenna information, for example, an SFBC scheme may be used as a transmit diversity scheme for two transmission antennas and an SFBC-FSTD scheme may be used as a transmit diversity scheme for four transmission antennas.

TABLE 3

| AntennaInfo information elements | |
| --- | --- |
| -- ASN1START | |
| AntennaInfoCommon ::= | SEQUENCE { |
| antennaPortsCount | ENUMERATED {an1, an2, an4, spare1} |
| } | |
| AntennaInfoDedicated ::= | SEQUENCE { |
| transmissionMode | ENUMERATED { |
| | tm1, tm2, tm3, tm4, tm5, tm6, tm7, spare1}, |
| codebookSubsetRestriction | CHOICE { |
| n2TxAntenna-tm3 | BIT STRING (SIZE (2)), |
| n4TxAntenna-tm3 | BIT STRING (SIZE (4)), |
| n2TxAntenna-tm4 | BIT STRING (SIZE (6)), |
| n4TxAntenna-tm4 | BIT STRING (SIZE (64)), |
| n2TxAntenna-tm5 | BIT STRING (SIZE (4)), |
| n4TxAntenna-tm5 | BIT STRING (SIZE (16)), |

TABLE 3-continued

| AntennaInfo information elements | |
| --- | --- |
| n2TxAntenna-tm6 | BIT STRING (SIZE (4)), |
| n4TxAntenna-tm6 | BIT STRING (SIZE (16)) |
| } OPTIONAL, | -- Cond TM |
| ue-TransmitAntennaSelection | CHOICE{ |
| release | NULL, |
| setup | ENUMERATED {closedLoop, openLoop} |
| } | |
| } | |
| -- ASN1STOP | |

In Embodiment 3, the 8-Tx antenna configuration and the transmission mode for 8-Tx antenna configuration are additionally defined in the existing "AntennaInfo" information element. Referring to Table 4, "an8" indicating the 8-Tx antenna configuration is additionally defined in antennaPortsCount and "tm8" is additionally defined in transmissionMode as a transmission mode for the 8-transmission antenna configuration.

TABLE 4

| AntennaInfo information elements | |
| --- | --- |
| -- ASN1START | |
| AntennaInfoCommon ::= | SEQUENCE { |
| antennaPortsCount | ENUMERATED {an1, an2, an4, an8} |
| } | |
| AntennaInfoDedicated ::= | SEQUENCE { |
| transmissionMode | ENUMERATED { |
| | tm1, tm2, tm3, tm4, tm5, tm6, tm7, tm8}, |
| codebookSubsetRestriction | CHOICE { |
| n2TxAntenna-tm3 | BIT STRING (SIZE (2)), |
| n4TxAntenna-tm3 | BIT STRING (SIZE (4)), |
| n2TxAntenna-tm4 | BIT STRING (SIZE (6)), |
| n4TxAntenna-tm4 | BIT STRING (SIZE (64)), |
| n2TxAntenna-tm5 | BIT STRING (SIZE (4)), |
| n4TxAntenna-tm5 | BIT STRING (SIZE (16)), |
| n2TxAntenna-tm6 | BIT STRING (SIZE (4)), |
| n4TxAntenna-tm6 | BIT STRING (SIZE (16)) |
| } OPTIONAL, | -- Cond TM |
| ue-TransmitAntennaSelection | CHOICE{ |
| release | NULL, |
| setup | ENUMERATED {closedLoop, openLoop} |
| } | |
| } | |
| -- ASN1STOP | |

The 3GPP LTE-A UE may acquire two pieces of information about the antenna configuration of the eNB through the PBCH. One is information about a basic antenna configuration supported by the eNB (indicating an antenna configuration for supporting a transmission scheme which may be decoded by both a UE (3GPP LTE-A UE) supporting the extended antenna configuration of the eNB as described in Embodiment 1 and a UE (3GPP LTE UE) which does not support the extended antenna configuration of the eNB) and the other is an antenna configuration actually arranged in the eNB. The two pieces of information about the antenna configuration may be the same or different. Additionally, antenna information may be acquired through RRC signaling. This information may be equal to or different from information acquired by decoding the PBCH by the UE.

An operation for acquiring information about the antenna configuration supported by the eNB through the PBCH and RRC signaling by the UE will now be described in detail.

As an example, it is assumed that the basic antenna configuration supported by the eNB through the PBCH is a 4-Tx antenna configuration, the number of transmission antennas actually arranged in the eNB is 8, and information indicated by the "Antenna information" information element of RRC signaling is an 8-Tx transmission antenna configuration. In this case, the UE may recognize that transmission from the eNB follows the transmission mode defined in the 8-Tx antenna configuration. As the transmission mode for the 8-Tx antenna configuration, a closed-loop spatial multiplexing with a dedicated RS scheme may be used.

As another example, it is assumed that the basic antenna configuration supported by the eNB through the PBCH is a 4-Tx antenna configuration, the number of transmission antennas actually arranged in the eNB is 8, and information indicated by the "Antenna information" information element of RRC signaling is a 4-Tx transmission antenna configuration. In this case, the UE may recognize that transmission from the eNB follows the transmission mode defined in the 4-Tx antenna configuration.

In the case in which the eNB having the 8-Tx antenna configuration supports the 3GPP LTE UE or performs transmission to the 3GPP LTE-A UE using the existing transmission scheme, the "Antenna information" information element of RRC signaling indicates that the number of transmission antennas is 1, 2 or 4 so as to perform transmission to the UE using the transmission mode defined in the indicated antenna configuration.

In the existing 3GPP LTE standard, seven transmission modes of (1) port 0 single-antenna port transmission, (2) transmit diversity, (3) open-loop spatial multiplexing, (4) closed-loop spatial multiplexing, (5) multi-user multiple input multiple output (MU-MIMO), (6) closed-loop rank 1 precoding and (7) port 5 single-antenna port transmission are defined. As the eNB supports the extended antenna configuration, a new transmission mode for the 8-Tx antenna configuration is considered and the transmission modes for 1, 2, 4 and 8 transmission antennas are shown in Table 5.

The physical layer module 511 may map a transport channel from the MAC layer module 512 to a downlink physical channel, transmit the transport channel to the UE, receive an uplink physical channel from the UE, and process and transmit the uplink physical channel to the MAC layer module 512. Control information and data move between the physical layers of a transmitter (e.g., eNB) and a receiver (e.g., UE) via a physical channel.

The MAC layer module 512 is connected to a radio link control (RLC) layer which is a higher layer through a logical channel. The RLC layer supports reliable data transmission.

The RRC layer module 513 is responsible for control of logical, transport, and physical channels in association with configuration, re-configuration and release of Radio Bearers (RBs). The RB is a service provided by the second layer (the MAC layer, the RLC layer or the PDCP layer) for data communication between the UE and the eNB. To accomplish this, the RRC layer module 513 serves to exchange RRC messages between the eNB and the UE. The UE is in RRC connected mode if an RRC connection has been established between the RRC layer of the radio network and the RRC layer of the UE. Otherwise, the UE is in RRC idle mode.

The eNB 510 for providing information about the transmission antenna of the eNB 510 to the UE according to an embodiment of the present invention will be described. The physical layer module 511 of the eNB 510 generates the PBCH including information indicating whether the eNB supports the extended transmission antenna configuration, adds a CRC bit masked with a specific bit stream corresponding to the transmission antennas of the eNB to the generated PBCH, and transmits the PBCH to the UE.

The eNB 510 for providing information about the transmission antenna of the eNB 510 to the UE 520 according to another embodiment of the present invention will be described. The eNB 510 may include an RRC layer module

TABLE 5

| | Transmission mode | SingleAntenna | 2TxAntenna | 4TxAntenna | 8TxAntenna |
|---|---|---|---|---|---|
| 1 | Single antenna port, port 0 | | X | X | |
| 2 | Transmit diversity | X | SFBC | SFBC-FSTD | |
| 3 | Transmit diversity, if the associated rank indicator is 1, otherwise large delay CDD | X | SFBC, SM with identity Matrix | SFBC-FSTD, SM with large delay CDD | Open-loop SM with dedicated RS |
| 4 | Closed-loop spatial multiplexing | X | 2Tx CB | 4Tx CB | |
| 5 | Multi-user MIMO | X | 2Tx CB | 4Tx CB | |
| 6 | Closed-loop spatial multiplexing with a single transmission layer | X | 2Tx CB | 4Tx CB | |
| 7 | If the number of PBCH antenna ports is one, Single-antenna port, port 0; otherwise Transmit diversity | | | | |
| 8 | Closed-loop spatial multiplexing with dedicated RS | X | X | X | 8Tx closed-loop |

FIG. 5 is a diagram showing the configuration of an eNB and a user equipment according to an embodiment of the present invention.

Referring to FIG. 5, the eNB 510 may include a physical layer module 511, a medium access control (MAC) layer module 512, a radio resource control (RRC) layer module 513, a processor 514, a memory 515 and a plurality of antennas 516.

513 configured to transmit an RRC signal to the UE and a physical layer module 511 configured to encode a PBCH, map the PBCH to downlink radio resources, and transmit the PBCH to the UE. The RRC layer 513 may be configured to generate an RRC signal including information about the number of transmission antenna ports of the eNB and a transmission mode and transmit the RRC signal to the UE. The RRC signal may include information indicating a maximum of eight antennas as the number of transmission antennas and one or more transmission modes using a maximum of eight transmission antennas.

The processor 514 of the eNB 510 serves to process information received by the eNB and information to be transmitted to an external device. The memory 515 may store the processed information for a predetermined time and may be replaced with a component such as a buffer (not shown).

Referring to FIG. 5, the UE 520 may include a physical layer module 521, a MAC layer module 522, an RRC layer module 523, a processor 524, a memory 525 and a plurality of antennas 526.

The physical layer module 521 may map a transport channel from the MAC layer module 522 to an uplink physical channel, transmit the transport channel to the eNB, receive a downlink physical channel from the eNB, and process and transmit the downlink physical channel to the MAC layer module 522.

The RRC layer module 523 is responsible for control of logical, transport, and physical channels in association with configuration, re-configuration and release of Radio Bearers (RBs). The RB is a service provided by the second layer (the MAC layer, the RLC layer or the PDCP layer) for data communication between the UE and the eNB. To accomplish this, the RRC layer module 523 serves to exchange RRC messages between the eNB and the UE.

The UE 520 will be described as the UE for acquiring the transmission antenna information of the eNB 510 according to an embodiment of the present invention. The UE 520 may include a physical layer module 521 configured to receive and decode a physical channel from the eNB and a processor 524. The processor is configured to control the UE 520 including the physical layer module 521. The physical layer module 521 may receive and decode a PBCH including information indicating whether the eNB 510 supports the extended transmission antenna configuration. The processor 524 checks the transmission mode of the PBCH depending on whether the PBCH is successfully decoded by the physical layer module 521 and acquire the transmission antenna information of the eNB from at least one of the checked transmission mode or the information indicating whether the eNB supports the extended transmission antenna configuration.

The UE 520 for acquiring the transmission antenna information of the eNB 510 according to another embodiment of the present invention will be described. The UE 520 may include a physical layer module 521 configured to receive and decode a PBCH from the eNB 510, an RRC layer module 523 configured to receive and process an RRC signal from the eNB 510, and a processor 524 configured to control the UE 520 including the physical layer module 521 and the RRC module 523. The RRC layer module 523 acquires information about the number of transmission antenna ports and a transmission mode included in the RRC signal. The RRC signal may include information indicating a maximum of eight transmission antennas as the number of transmission antennas and information indicating one or more transmission modes using a maximum of eight transmission antennas. The processor 524 may check the transmission mode of the PBCH depending on whether the PBCH is successfully decoded by the physical layer module 521 and acquire the transmission antenna information of the eNB 510 using at least one of the checked transmission mode or the RRC signal.

The processor 524 of the UE 520 serves to process information received by the UE and information to be transmitted to an external device. The memory 525 may store the processed information for a predetermined time and may be replaced with a component such as a buffer (not shown).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method for acquiring information about transmission antennas of a base station at a user equipment, comprising:
receiving a physical broadcast channel (PBCH) including information indicating whether the base station supports an extended transmission antenna configuration;
decoding the received PBCH and checking a transmission mode of the PBCH; and acquiring the information about the transmission antennas of the base station from at least one of the checked transmission mode or the information indicating whether the base station supports the extended transmission antenna configuration.

2. The method according to claim 1, further comprising:
checking a cyclic redundancy check (CRC) bit of the decoded PBCH; and
acquiring information about the number of transmission antennas of the base station from the CRC bit,
wherein the CRC bit is masked with a specific bit stream corresponding to the number of transmission antennas of the base station.

3. The method according to claim 2, wherein the specific bit stream for masking the CRC bit is determined according to Table 1:

TABLE 1

| Number of transmission antennas of base station | PBCH CRC mask |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |
| 8 | <1, 0, 1, 0, 1, 0, 1, 0, 1, 0, 1, 0, 1, 0, 1, 0> |

4. The method according to claim 1, wherein:
the information indicating whether the base station supports the extended transmission antenna configuration is composed of one bit,
if the information indicating whether the base station supports the extended transmission antenna configuration has a value of 1, the user equipment determines that the number of transmission antennas of the base station is 8, and
if the information indicating whether the base station supports the extended transmission antenna configuration has a value of 0, the user equipment determines that the number of transmission antennas of the base station is less than 8.

5. A method for acquiring information about transmission antennas of a base station at a user equipment, comprising:
receiving a radio resource control (RRC) signal including information about the number of transmission antenna ports of the base station and a transmission mode and a physical broadcast channel (PBCH);
decoding the received PBCH and checking the transmission mode of the PBCH; and
acquiring the information about the transmission antennas of the base station using at least one of the checked transmission mode and the RRC signal,
wherein the RRC signal includes information indicating a maximum of eight transmission antennas as the number of transmission antennas and one or more transmission modes using the maximum of eight transmission antennas.

6. The method according to claim 5, wherein the one or more transmission modes using the maximum of eight transmission antennas include a closed-loop spatial multiplexing with a dedicated reference signal.

7. A method for providing information about transmission antennas from a base station to a user equipment, comprising:
generating a physical broadcast channel (PBCH) including information indicating whether the base station supports an extended transmission antenna configuration; and
adding a cyclic redundancy check (CRC) bit to the generated PBCH and transmitting the PBCH to the user equipment,
wherein the CRC bit is masked with a specific bit stream corresponding to the number of transmission antennas of the base station.

8. A method for providing information about transmission antennas from a base station to a user equipment, comprising:
transmitting a radio resource control (RRC) signal including the number of transmission antenna ports of the base station and a transmission mode to the user equipment; and
transmitting a physical broadcast channel (PBCH) to the user equipment,
wherein the RRC signal includes information indicating a maximum of eight transmission numbers as the number of transmission antennas and one or more transmission modes using the maximum of eight transmission modes.

9. A user equipment for acquiring information about transmission antennas of a base station, comprising:
a physical layer module configured to receive and decode a physical channel from the base station; and
a processor configured to control the user equipment including the physical layer module,
wherein the physical layer module receives a physical broadcast channel (PBCH) including information indicating whether the base station supports an extended transmission antenna configuration and decodes the received PBCH, and
wherein the processor checks a transmission mode of the PBCH depending on whether the PBCH is successfully decoded by the physical layer module and acquires the information about the transmission antennas of the base station from at least one of the checked transmission or the information indicating whether the base station supports the extended antenna configuration.

10. A user equipment for acquiring information about transmission antennas of a base station, comprising:
a physical layer module configured to receive and decode a physical broadcast channel (PBCH) from the base station;
a radio resource control (RRC) layer module configured to receive and process an RRC signal from the base station; and
a processor configured to control the user equipment including the physical layer module and the RRC layer module,
wherein the RRC layer module acquires information about the number of transmission antenna ports and a transmission mode included in the RRC signal, the RRC signal including information indicating a maximum of eight transmission antennas as the number of transmission antennas and information indicating one or more transmission modes using the maximum of eight transmission antennas, and
wherein the processor checks a transmission mode of the PBCH depending on whether the PBCH is successfully decoded by the physical layer module and acquires the information about the transmission antennas of the base station from at least one of the checked transmission or the RRC signal.

11. A base station for providing information about transmission antennas to a user equipment, comprising:
a physical layer module configured to encode a physical channel, map the physical channel to downlink radio resources, and transmit the physical channel to the user equipment, wherein the physical layer module generates a physical broadcast channel (PBCH) including information indicating whether the base station supports an extended transmission antenna configuration, adds a cyclic redundancy check (CRC) bit masked with a specific bit stream corresponding to the number of transmission antennas of the base station to the generated PBCH, and transmits the PBCH to the user equipment.

12. A base station for providing information about transmission antennas to a user equipment, comprising:
 a radio resource control (RRC) layer module configured to transmit an RRC signal to the user equipment; and
 a physical layer module configured to encode a physical broadcast channel (PBCH), map the PBCH to downlink radio resources, and transmit the PBCH to the user equipment,
 wherein the RRC layer module generates and transmits the RRC signal including the number of transmission antenna ports of the base station and a transmission mode to the user equipment, and
 wherein the RRC signal includes information about a maximum of eight transmission antennas as the number of transmission antennas and one or more transmission modes using the maximum of eight transmission antennas.

* * * * *